G. W. FLETCHER.
RINGING AND DOCKING INSTRUMENT.
APPLICATION FILED OCT. 16, 1911.
1,015,162. Patented Jan. 16, 1912.
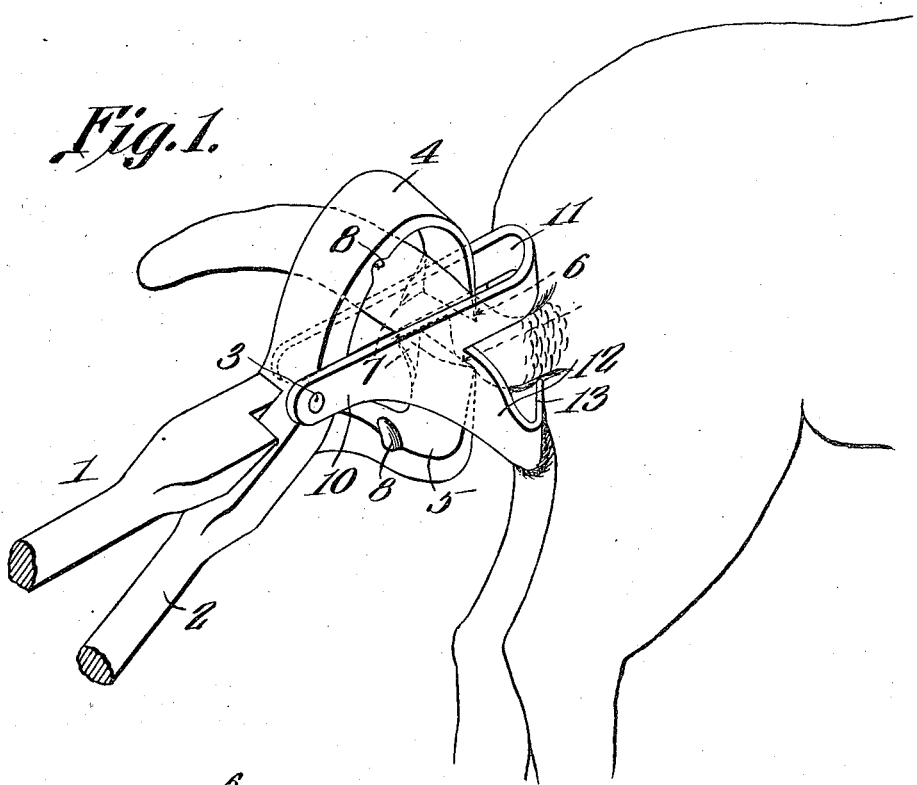
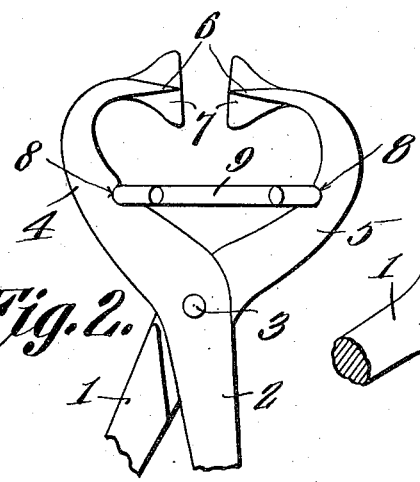
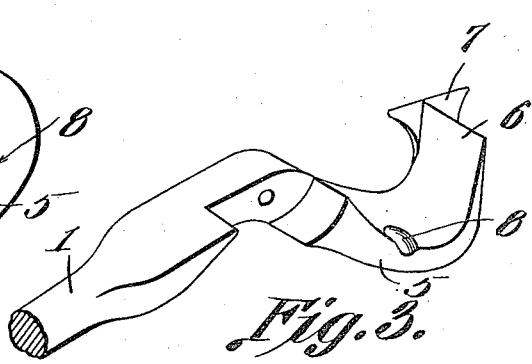
Witnesses
George W. Fletcher,
Inventor
by
Attorneys

UNITED STATES PATENT OFFICE.

GEORGE W. FLETCHER, OF MENDON, ILLINOIS.

RINGING AND DOCKING INSTRUMENT.

1,015,162.  Specification of Letters Patent.  Patented Jan. 16, 1912.

Application filed October 16, 1911. Serial No. 654,905.

*To all whom it may concern:*

Be it known that I, GEORGE W. FLETCHER, a citizen of the United States, residing at Mendon, in the county of Adams and State of Illinois, have invented a new and useful Ringing and Docking Instrument, of which the following is a specification.

The present invention relates to improvements in ringing and docking instruments, the primary object of the present invention being the provision of a pair of pliers or tongs provided with cutting means and with a clamping or guiding device whereby the tail of the animal to be docked, such as lambs, is placed through the guide, the said guide pressing the skin toward the body of the animal and stretching the same tightly at the point to be engaged by the cutting ends of the pliers or tongs, so that when the said pliers or tongs are operated to sever the tail, the skin thus stretched toward the body will form a flap when released to cover the stub or cut end and thereby form a covering therefor and facilitate the healing.

A further object of the present invention is the provision of a pair of cutting pliers or tongs provided with peculiarly shaped cutting edges which are adapted for docking tails or for providing cuts in the nostrils of hogs to prevent rooting, the said jaws of the pliers or tongs being further provided with sockets for the reception of open rings to be forced through the nostril of the hog to also prevent rooting.

A still further object of the present invention is the provision, of an attachment or pivoted bail pivotally connected to the pivotal point of the jaws of the pliers and of such a length as to extend over the exterior face of the cutting portion thereof to provide a guide and a guard for straddling the tail of the animal to be severed, and at the same time pressing the skin toward the body so that the said skin is stretched at the point of severance, so that when the tail is cut or docked, the skin thus stretched will form a covering for the stub or cut end and not allow the bone to protrude.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a perspective view of the instrument in the position it assumes when docking the tail of a lamb. Fig. 2 is a bottom plan view of the cutting end of the pliers or instruments showing a hog ring in position for clamping. Fig. 3 is a perspective view of one of the jaws of the pliers.

Referring to the drawings, the numerals 1 and 2 designate respectively, the two handles of the pliers, which as shown are recessed and pivoted by a pin 3, so that the jaws 4 and 5, which are curved as clearly shown and are provided with the transverse cutting edges 6 and the peculiar shaped hog nose cutters 7, may be moved into and out of engagement with each other. Upon the inner face of the respective jaws 4 and 5 are the sockets or recesses 8 which provide a means for the reception of the open rings such as 9, the same being held in such position as to be readily snipped or forced through the nose of the hog in the usual manner.

When it is desired to use the device for cutting the nose of a hog to prevent rooting the peculiarly shaped cutters 7 are employed to snip or form an elongated and T-shaped cut, with the blade 6, in the nose in the usual manner.

As viewed in Fig. 1, the instrument is used in docking lambs' tails, the two terminals 10 of the guard and guide 11 being pivotally connected to the pin 3 which is the pivot of the two jaws 4 and 5, the said bail or guide 11 being of such length as to readily describe a circle beyond the outer cutting ends of the said jaws so that the same may be swung in the position as shown in Fig. 1, or back upon either handle 1 or 2 when not in use. Formed integral with one terminal of the said guide or guard 11 and bent downwardly therefrom, is an arm 12 provided with the hook or terminal 13, the same providing a space to permit the insertion of the tail of the animal to be docked, so that the said tail will be guided and guarded through the space as shown in Fig. 1 and be projected between the cutters 6 and above one terminal 10 of the guide or guard 11, the finger or gage 13 coacting with the underside of the bail portion 11 to push the loose skin toward the body of the animal so as to tighten it throughout its length and especially at the point of severance between the abutting edges of the cutting blades 6. When the instrument is placed as shown in Fig. 1, it is simply necessary to operate the handles 1 and 2 to bring the cutters 6 together through the tail of the animal, thus severing the bone or at the joint between the same, the stub or docked portions slipping between the underside of the guide 11 and the finger 13 and as the skin has been stretched toward the body, the same will readily extend of its own account so as to cover the cut or stub end and provide a protection for the cut or joint of the bone at such point.

It will thus be seen that the present instrument is very simple in operation and that when inserting the tail of an animal to be severed, it is simply necessary to slide the same below the underside of the bail 11 and project it upwardly over one side so that the same will project between the cutting edges of the jaws of the pliers, a finger 13 engaging the skin at one side and below and coacting with the underside of the bail portion 11 to stretch the same toward the body of the animal, and thus provide a means whereby sufficient skin is left to fully cover and protect the stub or cut end of the tail of the animal.

What is claimed is:

1. A device of this character, having a pair of pliers, the jaws of which have cutting edges, and a tail guide and gage mounted for coöperation with said cutting edges.

2. A device of this character, having a pair of pliers the jaws of which are provided with cutting edges, and a tail guide and gage pivoted to the pivot of the jaws for swinging movement into and out of operative position.

3. A pair of cutting pliers having a pivoted tail guide and gage connected thereto.

4. A pair of cutting pliers, having a bail with its terminals pivoted to the pivot of the jaws of the pliers, said bail being of sufficient length to straddle the jaws of the pliers, and a downwardly extending finger carried thereby at one side of the bail and coacting with the underside to form a tail guide and gage.

5. An instrument of the class described, comprising a pair of pliers having bowed jaws terminating in cutting edges, a frame straddling the jaws and pivoted to swing with the pivot of the jaws its pivotal point, and an arm having a terminal disposed to coact with the forward underside of the frame to receive a tail to be docked.

6. An instrument of the class described, comprising a pair of pliers having bowed jaws terminating in cutting edges, a frame straddling the jaws and pivoted to swing with the pivot of the jaws its pivotal point, and an arm to coact with the frame to stretch the skin toward the body of the animal during the severance of the tail to provide a surplus of skin to cover the stub end at the point of severance.

7. An instrument of the class described, comprising a pair of pliers having bowed jaws terminating in cutting edges, a frame straddling the jaws and pivoted to swing with the pivot of the jaws its pivotal point, said frame being of such a length as to project beyond the outer face of the cutting edges of the jaws when in operable relation, and a downwardly projecting and inwardly curved arm carried by one side of the frame and having its curved end disposed to coact with the forward underside of the frame to receive the tail to be docked.

8. An instrument of the class described, comprising a pair of pliers having bowed jaws terminating in cutting edges, a frame straddling the jaws, with the terminals thereof pivoted to the pivotal point of the jaws, said frame being of such a length as to project beyond the outer face of the cutting edges of the jaws when in operable relation thereto, and a downwardly projecting and inwardly curved arm carried by one side of the frame to coact with the underside thereof to stretch the skin toward the body of the animal during the severance of the tail to provide a surplus of skin to cover the stub end at the point of severance.

9. An instrument of the class described, comprising a pair of pliers having bowed jaws terminating in cutting edges, a frame having the terminals thereof pivoted to the pivotal point of the jaws, the body portion of the frame projecting and terminating exteriorly of the jaws and when in operable relation beyond the outer face of the cutting edges thereof, the width of said frame permitting the tail to be docked to be projected over the side of the frame between the underside of the bowed portion of one of the jaws when placed between the cutting edges of the jaws, and an arm carried by one terminal of the frame and having its terminal disposed below and in spaced relation to the underside of the frame to coact therewith to form a tail gripping means to stretch the skin toward the body of the animal during the severance of the tail.

In testimony that I claim the foregoing as my own, I have hereto affixed my signature in the presence of two witnesses.

GEORGE W. FLETCHER.

Witnesses:
CARL E. EPLER,
RUTH RUMMENIE.

Copies of this patent may be obtained for five cents each, by addressing the "Commissioner of Patents, Washington, D. C."